United States Patent [19]
Wilson

[11] 3,730,273
[45] May 1, 1973

[54] IMPROVED TECHNIQUE FOR INJECTING FLUIDS INTO SUBTERRANEAN FORMATIONS

[75] Inventor: James W. Wilson, Brea, Calif.

[73] Assignee: Union Oil Company of California, Los Angeles, Calif.

[22] Filed: Apr. 30, 1971

[21] Appl. No.: 138,946

[52] U.S. Cl. ............... 166/269, 166/274, 166/300, 166/305, 166/313
[51] Int. Cl. .... E21b 43/16, E21b 43/25, E21b 43/27
[58] Field of Search .............. 166/295, 300, 273, 166/274, 313, 269, 305

[56] References Cited

UNITED STATES PATENTS

| | | | |
|---|---|---|---|
| 3,251,413 | 5/1966 | Rudisell | 166/269 |
| 3,157,232 | 11/1964 | Remos | 166/300 |
| 2,869,642 | 1/1959 | McKay | 166/308 X |
| 3,415,318 | 12/1968 | Meijs | 166/300 X |
| 3,614,985 | 10/1971 | Richardson | 166/294 |
| 3,135,326 | 6/1964 | Santee | 166/273 X |
| 3,637,019 | 1/1972 | Lee | 166/295 |
| 3,565,175 | 2/1971 | Wilson | 166/269 |
| 2,973,039 | 2/1961 | Payne | 166/269 UX |
| 2,141,419 | 12/1938 | Spang | 166/269 X |

*Primary Examiner*—Robert L. Wolfe
*Attorney*—Milton W. Lee, Richard C. Hartman, Lannas S. Henderson, Dean Sandford, Robert E. Strauss and M. Dale Nelson

[57] ABSTRACT

A method for simultaneously injecting a plurality of fluid mixtures into a like plurality of vertically disposed subterranean strata penetrated by at least one injection well is disclosed. In the process, controlled quantities of at least two injection fluids are injected into the well bore at elevations adjacent each of the vertically disposed strata and the fluids are allowed to mix in the well bore at each elevation. A property promoting additive is incorporated within one of the injection fluids so that the resulting fluid mixtures contain the desired concentration of the additive. The mixtures are thereafter forced into the adjacent subterranean strata.

20 Claims, 3 Drawing Figures

3,730,273

IMPROVED TECHNIQUE FOR INJECTING FLUIDS INTO SUBTERRANEAN FORMATIONS

DESCRIPTION OF THE INVENTION

This invention relates to a method for injecting a plurality of fluids into a subterranean formation, and more specifically to a method for simultaneously injecting a plurality of fluid mixtures into a like plurality of vertically disposed subterranean strata.

BACKGROUND OF THE INVENTION

In the recovery of petroleum oil and gas from subterranean formations it is often expedient to inject a plurality of treating solutions into the formation either through a producing well or through a nearby injection well. The treating of subterranean formations with more than one fluid, while not approaching the ubiquity of single fluid treating, is being applied to an increasing number of commercial processes. Exemplary of these processes include, viscous water flooding, acidizing, scale and wax inhibiting and removing, fracturing, etc.

In each of the treating processes, the various injection fluids are introduced into the formation through separate injection tubes. Each tube is suspended from the formation surface and terminates at an elevation adjacent the respective stratum to be treated by that fluid. Thus in this method, the several injection fluids are introduced into the formation at different elevations through the severally suspended injection tubes. This technique, while accomplishing the ultimate process objectives, is seriously hampered by economic and mechanical difficulties.

One of the difficulties evolves from preparing the various treating solutions at the formation surface prior to their injection into the well. For example, the surface preparation requires expensive mixing equipment, separate injection pumps and separate piping for each treating solution employed, and this consequently impresses a serious economic burden on the operation of the process. Another problem arises when several injection tubes are inserted into the well bore. Each tube represents a sizeable economic investment and whenever it is desirous to inject a large number of solutions into a given formation, an equivalent large number of these tubes must be provided. Expectedly, the cost of these tubes often renders the process economically prohibitive.

The injection technique is further hampered with serious mechanical limitations. For example, the well bore is of finite size and can contain only a limited number of tubes. The size limitation thus restricts the total number of solutions which can be simultaneously injected into a given formation. These problems, and others not mentioned, have enhanced the reasons for developing a new improved method for simultaneously injecting a plurality of treating solutions into a subterranean formation.

It is an object of this invention to provide a method for simultaneously injecting a plurality of fluids into a subterranean formation. It is another object of this invention to provide a method for simultaneously injecting a plurality of solutions into a like plurality of vertically disposed subterranean strata. It is another object of this invention to provide an improved well completion.

Other objects of this invention will become apparent from the following disclosure and from the attached drawings of which:

Figure 2:
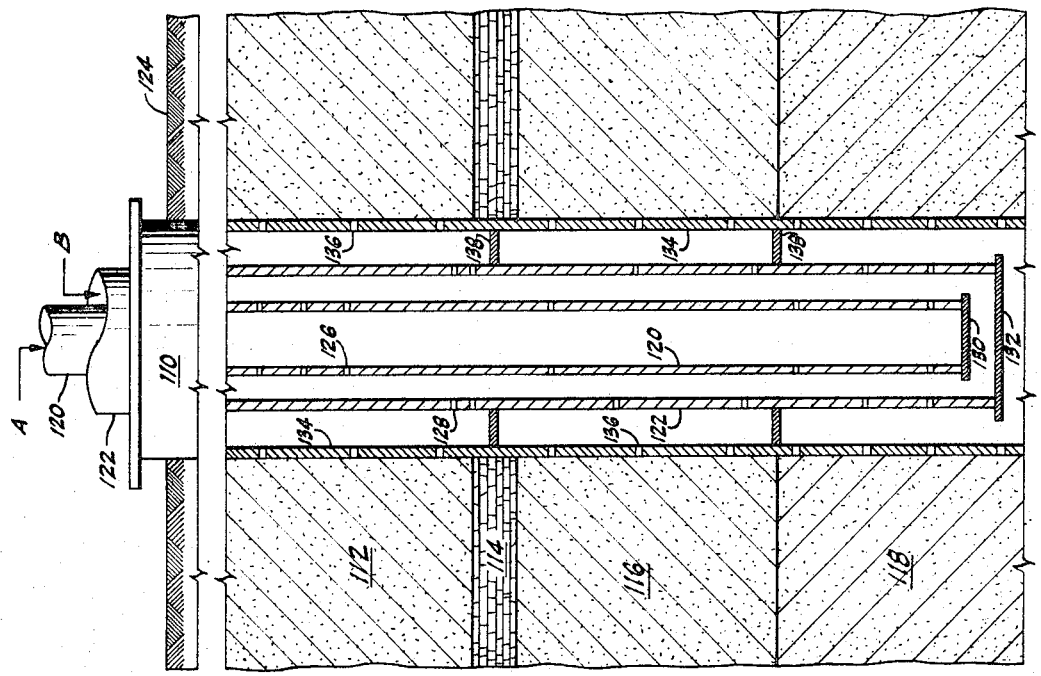
FIG. 2 illustrates a cross-sectional view of another embodiment of a well completed in accordance with this invention.

The manner in which the foregoing and other objects of this invention are realized will become apparent from the accompanying specification, claims and appended drawings. Briefly, the invention contemplates a method for simultaneously injecting into a subterranean formation a plurality of fluid mixtures formed in situ within the well bore adjacent the subterranean strata to be treated. Specifically, the invention involves separately injecting controlled volumes of two or more injection fluids into the well bore at various elevations adjacent the subterranean strata to be contacted. The injection fluids are allowed to mix within the well bore at each elevation to form the fluid mixtures. A property promoting additive is incorporated into one of the injection fluids to promote one or more of the physical properties of the fluid mixtures. The volumetric amount of each injection fluid introduced at each elevation is regulated to provide a plurality of fluid mixtures having the desired concentration of additive and the corresponding desired physical properties. After the fluid mixtures are formed in the well bore or concurrent with the mixing, they are forced into the adjacent subterranean strata in accordance with the conventional treating processes.

INJECTION FLUIDS

The injection fluids can comprise any liquid which is readily pumpable, inert to the formation substructure and which is abundant and relatively inexpensive. The fluids can contain the same basic constituents, such as, water and brine or, alternatively, the fluids can be entirely distinct such as, water and a hydrocarbon oil. Generally, however, it is preferred that the injection fluids be miscible in a mixture of the same. Exemplary injection fluids include, water, brine, aqueous carbon dioxide, hydrocarbon oils, liquefied petroleum gas, etc. The most preferred injection fluids include water, brine, and petroleum oil.

A property promoting additive is incorporated into one of the injection fluids to impart the desired physical properties to the fluid mixtures formed in the well bore. The additive is generally incorporated into just one of the injection fluids, however, it is recognized that in a few applications it may be advantageous to incorporate the same or different additives into two or more of the injection fluids. The additive-containing injection fluid is injected into the well bore and mixed with an injection fluid containing little or no additive to form fluid mixtures having a diluted but proper additive concentration.

PROPERTY PROMOTING ADDITIVES

The property promoting additive is any additive which when incorporated into the fluid mixtures substantially changes the measurable physical properties of the mixtures. Exemplary additives include acids, such as, hydrochloric, hydrofluoric, citric, formic, acetic, etc., and combinations thereof; plugging agents, such as, solid particles of inorganic matter like, talc, calcium carbonate, sand, ground walnut shells, etc., solid particles of organic matter which are insoluble in water and slowly soluble in oil, such as, wax, naphthalene, wax-hydrocarbon blends, wax-polymer blends, wax-polymer-resin blends, etc., and especially wax-copolymer ethylene-vinyl acetate blends; scale inhibitors, such as phosphorous containing inhibitors like, alkyl phosphonic acids, such as, 1-carboxy-1-hydroxyethylphosphonic acid, reaction products of alkyl-ketoaliphatic carboxylic acids with phosphinic acid and alkali metal phosphites, such as, bis(1-carboxy-1-hydroxy-1-methyl) phosphinic acid and the alkali metal salts thereof, bis(1-carboxy-1-hydroxy-1-ethyl)phosphinic acid, monometaphosphoric acid and the alkali metal salts thereof; wax inhibitors such as, calcium petroleum sulfonate, liquid aromatic fractions and especially aromatic fractions containing alkyl naphthalenes, polycyclic coal tar products, such as, alkylated and hydroxylated derivatives of naphthalene, anthracene, pyrene, fluorene, naphthacene, etc., aromatic compounds, such as, diphenyl, 4-hydroxy diphenyl, naphthal, etc., aliphatic ether alcohols, such as, alkyl ethers or ethylene glycol, dimethyl ether, ethyl and butyl ethers of glycerol, etc., and dialkyl ethers.

A particularly useful additive is a viscosity increasing agent. Generally, these agents are soluble in the treating fluid and comprise high molecular weight organic compounds, such as, fatty acid soaps, alginates, sucrose, glycerine and a magnitude of water-soluble polymers. Of these, the water-soluble polymers are preferred. Preferred polymers include modified starches and zanthum gum obtained by the fermentation of starch-derived sugar; alkyl and hydroxyalkyl cellulose derivatives, such as, carboxymethyl cellulose and hydroxymethyl cellulose; water-soluble synthetic polymers, such as, polyvinyl alcohol, polyvinyl pyrolidone, polyacrylic acid, polyvinyl-pyridine, polyacrylamides, polystyrene sulfonates, polyoxyethylene polymers, and various homologs of these polymers, and copolymers of the aforementioned polymers with other polymeric substances.

The concentration of the additive incorporated within one of the injection fluids varies depending upon the additive selected, the total number of fluid mixtures which will be formed and the desired additive concentration in the various mixtures. Generally, however, the concentration of the additive should be maintained between about 1 and 10 times the desired concentration in the most concentrated fluid mixture. The amount of additive in the injection fluid, however, should not be so great so as to render the treating fluid impractical to store, transport, or pump.

The additives can be mixed with the injection fluid at the injection site or, alternatively, a slurry of the additive can be transported to the site and there mixed with an appropriate quantity of injection fluid. In a preferred embodiment, the additive is injected directly into the injection tube at the well head along with the injection fluid. In this manner the additive is allowed to mix with the fluid while traveling downwardly within the injection tube.

WELL COMPLETION

The injection fluids are injected into a well bore of an injection well completed in accordance with this invention. In the well completion, a separate injection tube is inserted into the well for each injection fluid employed. The tubes are suspended from the formation surface and extend to depths below the lowermost stratum to be treated and, generally to the bottom of the formation. Each tube is perforated at well elevations adjacent the respective strata to be contacted with the number and size of the perforations being controlled so that the volumetric flow rate of injection fluid introduced into the well bore at each elevation can be regulated within about 5 to 20 percent of the desired flow rate. The injection fluids enter the bore hole through the perforations at each elevation and mix therein to form fluid mixtures having the desired concentration of additive.

The injection tubes are generally perforated at the surface prior to their insertion into the well bore by drilling the appropriate number of holes of a selected size into the tubes at locations corresponding to the elevation of the strata to be contacted. In some instances it may be advantageous to perforate the tubes within the well bore, however, in this method care must be taken so that the number and size of the perforations are adequately controlled to release the appropriate amount of injection fluid into the well bore.

After the injection tubes are inserted into the well bore, packers can be placed between the various subterranean zones. These packers are provided to prevent mixing of adjacent fluid mixtures within the well bore. The packers, however, are not necessary for the practice of this invention and only represent a preferred embodiment. Moreover, a packer may be placed between strata at one elevation but not in another. Some of the preferred well completions illustrating the practice of this invention are presented in FIGS. 1 – 3.

Figure 1:
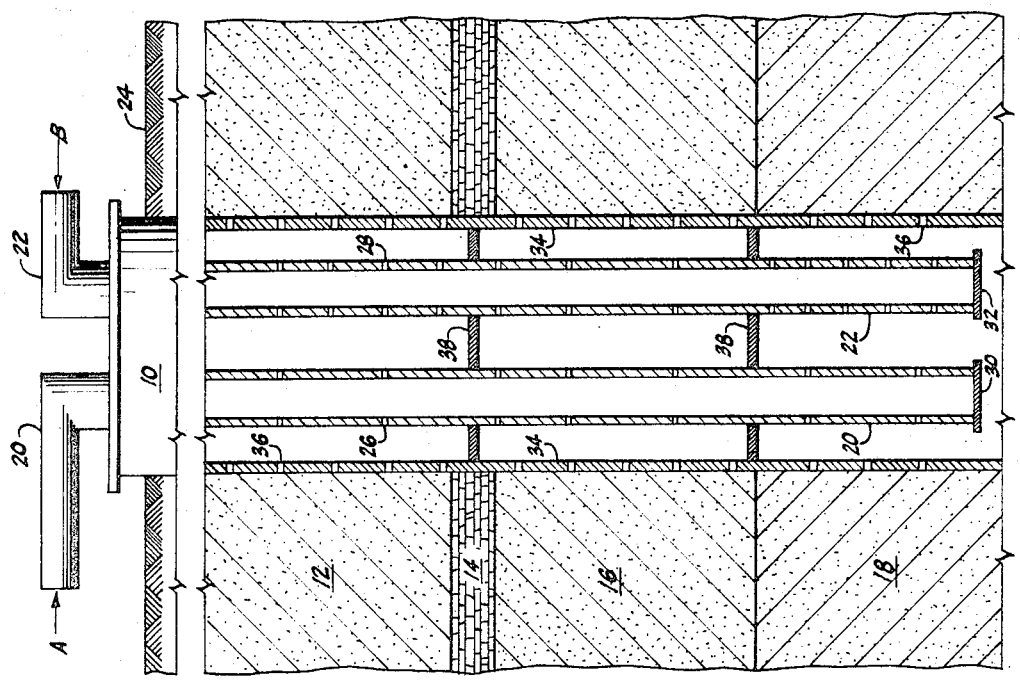
FIG. 1 illustrates a cross-sectional view of a well completed in accordance with this invention.

Referring now to the drawings, FIG. 1 illustrates a cross-sectional view of a completed injection well penetrating a multizone reservoir. As shown in the drawing, bore hole 10 is drilled through a subterranean formation having multiple permeable strata 12, 16 and 18 and impermeable stratum 14. Injection tubes 20 and 22 are inserted in the well 10 in a juxtapose position and are suspended from the formation surface 24 to the bottom of the well adjacent the lowest stratum 18. The injection tubes 20 and 22 are perforated with holes 26 and 28 respectively, at various well bore elevations adjacent strata 12, 16 and 18. The number and size of perforations 26 and 28 are made in accordance with the calculated volumetric flow rate of fluid necessary to pass through each tube at each well bore elevation to form mixtures having the desired concentration of additives. The ends of injection tubes 20 and 22 are closed with caps 30 and 32, respectively, to prevent uncontrolled quantities of the injection fluids to escape into the bore hole 10 at the bottom of the well. The injection well is protected with a suitable casing 34 which is perforated with holes 36 to allow the fluid mixtures to pass from the well bore into the strata 12, 16 and 18. Packers 38 are placed at selected elevations in the well bore to prevent in-well mixing of the various mixtures and to guide the respective mixtures into the adjacent strata.

In operation, an injection fluid A containing a property promoting additive is injected into tube 20, and injection fluid B is simultaneously injected into tube 22. As the fluids travel downwardly within tubes 20 and 22, controlled volumes of each fluid enter the bore hole adjacent strata 12, 16 and 18 through perforations 26 and 28. The two injection fluids mix in the bore hole at each elevation and form fluid mixtures having the desired concentration of additive. The injection is continued and the resulting mixtures are forced into formation. After sufficient amounts of the mixtures have been made a common fluid is injected into both injection tubes as a pusher fluid to force the mixtures deep into the formation.

FIG. 2 illustrates another embodiment of this invention and displays a cross-sectional view of a completed well bore penetrating a multizone reservoir. A bore hole 110 is drilled through a subterranean formation having permeable strata 112, 116 and 118 and impermeable stratum 114. An injection tube 122 containing a coaxially mounted smaller injection tube 120 is inserted into the well bore 110, and suspended from the surface 124 to the bottom of the well adjacent stratum 118. The two injection tubes 120 and 122 are perforated with holes 126 and 128 respectively at various well bore elevations adjacent subterranean strata 112, 116 and 118. The number and size of holes 126 are determined by calculating the volumetric flow rate of injection fluid necessary to pass through the injection fluid in tube 122 and form the desired mixtures. The number and size of holes 128 in tube 122 are selected so as to allow the mixtures within the annulus to pass into the well bore adjacent strata 112, 116 and 118. The ends of injection tubes 120 and 122 are plugged with caps 130 and 132 respectively, to prevent uncontrolled quantities of either injection fluids from leaving the respective tubes. The well bore 110 is protected with a suitable casing 134 which is perforated with holes 136 to allow the fluid mixtures to pass from the well bore into the strata 112, 116 and 118. Packers 138 are placed between the various permeable strata to prevent in-well mixing of the various mixtures and to guide the same into the adjacent strata 112, 116 and 118.

In an exemplary operation an injection fluid A containing a property promoting additive is injected into tube 120 and an injection fluid B is simultaneously injected into tube 122. Fluid A travels downwardly in the well within tube 120 and fluid B travels downwardly within the annulus formed between the coaxially mounted tubes. As fluid A proceeds down tube 120, controlled quantities of the fluid enter the annulus at elevation adjacent the various strata by passing through perforations 126 and mix with fluid B. Hence, fluid A successively mixes with more and more of fluid B within the annulus to form mixtures having a progressively increasing concentration of additive. The mixtures in the annulus are allowed to enter the well bore at selected elevations adjacent strata 112, 116 and 118 through the perforations 128 in outer tube 122. The injection of fluids A and B is maintained so as to force the appropriate amount of fluid mixtures in each packed section into the respective strata.

Figure 3:
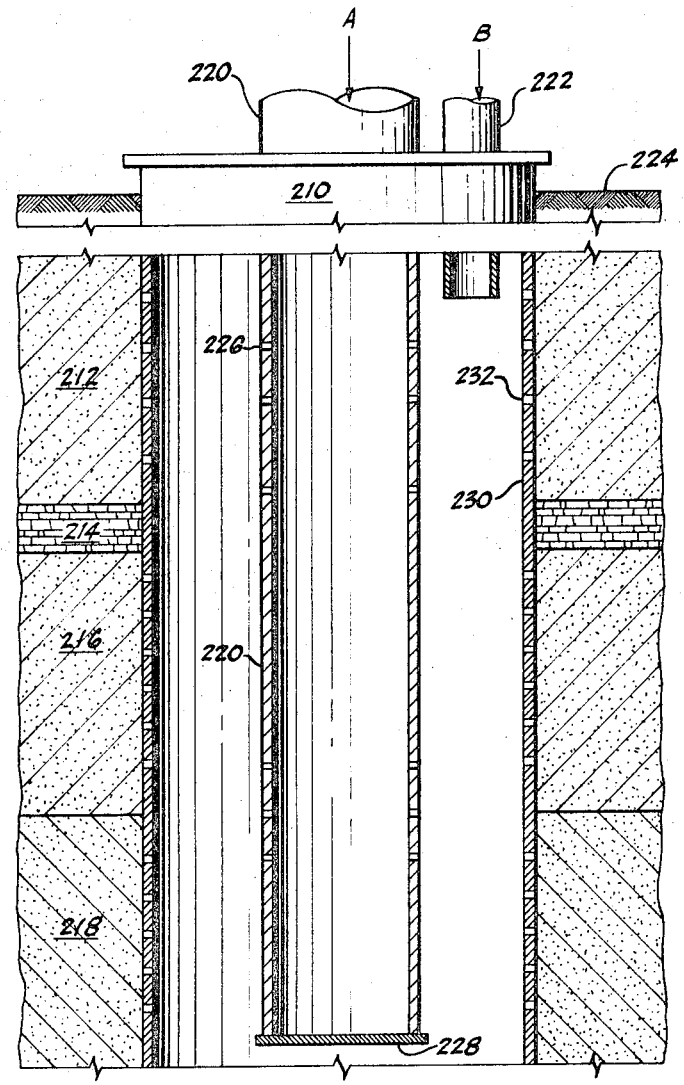
FIG. 3 illustrates a cross-sectional view of a third embodiment of a well completed in accordance with this invention.

FIG. 3 illustrates a third embodiment of this invention and displays a cross-sectional view of a well bore penetrating a multizone reservoir. This embodiment illustrates a specific mode of practice wherein the well casing is utilized as one of the injection tubes. In this well completion, a bore hole 210 is drilled through a subterranean formation having permeable strata 212, 216 and 218 and impermeable stratum 214. Two injection tubes 220 and 222 are inserted into the well bore and suspended from the formation surface 224. Injection tube 220 extends from the formation surface 224 to the bottom of the formation adjacent lower stratum 218, while injection tube 222 extends from the formation surface to a desired well bore elevation above the uppermost stratum 212. Injection tube 220 is perforated with holes 226 at selected well bore elevations adjacent the strata 212, 216 and 218. The number and size of the perforations 226 in tube 220 are determined in a similar manner as the perforations 126 in the well completion illustrated in FIG. 2. The end of injection tube 210 is plugged with cap 228 to prevent an uncontrolled amount of fluid from flowing from the end of the tube 220 into the bottom of the well bore 210. Tube 222 is uncapped to allow all of the injected fluid to enter the well bore above the uppermost oil-bearing strata 212. The well bore is protected with a suitable casing 230 which is perforated with holes 232 to allow the fluid mixtures to pass from the well bore into the strata 212, 216 and 218.

In operation, injection fluids A and B are simultaneously injected into the input well through injection tubes 220 and 222 respectively. One of the injection fluid contains a property promoting additive while the other does not. A fluid A travels downwardly within injection tube 220, controlled quantities of the fluid enter the bore hole 210 through perforations 226. Fluid B injected into tube 222 enters the bore hole through the uncapped end of tube 222 above the uppermost stratum 212. As the fluid from tube 222 proceeds downwardly within the bore hole it successively mixes with fluid injected into the bore hole from tube 220 to form mixtures having progressively increasing or decreasing concentrations of additive. Perforations 232 in casing 230 allow the mixtures within the bore hole to enter the respective strata.

The above disclosed well completions represent only a limited number of embodiments of the structure and method of this invention. It is readily apparent that numerous other embodiments can be made without departing from the inventive concepts herein disclosed.

The injection technique of this invention has numerous commercial applications. For example, the technique can be successfully applied to viscous flooding processes in secondary oil recovery wherein a plurality of differently viscosified solutions are injected into the formation and oil is recovered from a nearby production well. In these applications, a viscosity increasing agent is incorporated into one of the injection fluids and its concentration is controlled so as to form fluid mixtures having the desired viscosities. Representative flooding processes of this type are disclosed in U.S. Pat. Nos. 3,251,413 and 3,565,175.

The technique can also be used in selective acidizing processes wherein it is desirous to inject varying strengths of an acidified solution into the formation. In these processes, a fluid mixture containing a high concentration of an acid additive is formed within the well bore adjacent the relatively impermeable strata while simultaneously therewith a mixture having a lower concentration of acid is formed adjacent the more permeable strata.

The advantages of this invention can also be realized in well treating processes wherein scale inhibitors are injected into the formation. In this application, a treating mixture having a high concentration of a scale inhibitor is mixed within the well bore adjacent the strata seriously affected by scale deposits and a treating fluid containing a lower concentration of inhibitor is mixed at elevations adjacent the strata less affected by the undesirable deposits.

The technique of this invention can also be used in fracturing or other processes wherein it is desirous to maintain fluid loss at a minimum. In these applications, treating solutions containing a plugging agent at high concentrations are contacted with high permeable zones where fluid loss is relatively high, and treating solutions containing low concentrations of the plugging agent are contacted with the less permeable zones where fluid loss is not as detrimental. In this manner the permeability of the formation is decreased uniformly thereby reducing excessive fluid loss without injuring or further reducing the permeability of the low permeable zones.

It is apparent that the injection technique of this invention can be employed in any well treating process wherein a plurality of treating fluids are simultaneously injected into the formation, and such processes are considered within the scope of this invention.

The injection method of this invention will be more readily understood by reference to the following examples.

EXAMPLE 1

This example illustrates the injection technique of this invention in a selective acidizing process. A well is drilled through a subterranean oil-bearing formation to a depth of 3100 feet with an 8-⅝ inch well casing and traversing low permeable oil-bearing limestone strata at 2800 to 2820 feet and at 2900 to 2910 feet having estimated permeabilities of 5 and 10 millidarcies, respectively, and a very low permeable oil-bearing limestone stratum at 2980 to 3100 feet, having an estimated permeability of less than 1 millidarcy. Permeable oil-bearing strata is found at 2850 to 2900 feet and 2930 to 2980 feet, having permeabilities greater than 100 millidarcies, and all other intervals not included within the above ranges are impermeable formation rock. Two 3 inch diameter iron injection tubes are inserted into the well and suspended from the formation surface to the bottom of the well. Packers are inserted in the well at 2980 feet, 2910 feet, 2900 feet and 2820 feet to pack off the injection tubes between the various limestone intervals.

Each of the injection tubes are perforated at the surface prior to the insertion in the well with ⅛ inch diameter aperatures between the intervals of from 2800 to 2820 feet, 2900 to 2910 feet and 2980 to 3100 feet. One of the injection tubes (Tube A) is perforated with 10 aperatures between the first interval, 5 aperatures between the second interval and 25 aperatures between the third interval; while the other injection tube (Tube B) is perforated with 26, 3 and 40 aperatures for the above intervals, respectively.

The acidizing operation is started by injecting 410 gallons per hour of water into tube A and 490 gallons per hour of 45 weight percent aqueous acetic acid into injection tube B. The injected fluids are apportioned between the various perforated intervals by the number and location of the several aperatures. It is observed that approximately 100 gallons per hour enter the first perforated interval from both injection tubes and form a fluid mixture containing 22 weight percent acetic acid; approximately 60 and 40 gallons per hour enter the second interval from tubes A and B respectively and form a fluid mixture containing 18 weight percent acetic acid; and approximately 250 and 350 gallons per hour enter the third perforated interval from injection tubes A and B respectively to form fluid mixture containing 26 weight percent acetic acid. The injection rate is continued for 48 hours and thereafter the acid is allowed to soak in the formation for one week. The injection tubes are removed and production strings are inserted in the well. Oil production is observed to be substantially increased from the acidizing treatment.

EXAMPLE 2

This example illustrates the practice of this invention as applied to viscous water-flooding of a multiple zone formation having oil-bearing strata of varying permeability. An injection well is drilled through an oil-bearing formation to a depth of 3000 feet and completed with a 8-⅝ inch well casing. The well traverses oil-bearing strata at 2600 to 2700 feet having a permeability of 10 millidarcies and a porosity of 20 percent, at 2750 to 2800 feet having a permeability of 25 millidarcies and a porosity of 10 percent, and at 2950 to 3000 feet having a permeability of 50 millidarcies and a porosity of 15 percent; and traverses impermeable rock strata between the intervals of 2700 and 2750 feet and 2800 and 2950 feet each susceptible to vertical cross-flow between adjacent oil-bearing strata. Two 3½ inch diameter injection tubes are inserted in the well and suspended from the formation surface to the bottom of the well. Packers are placed at 2725 feet and at 2825 feet to pack off the sections in the well bore adjacent the permeable oil-bearing strata.

The following table 1 summarizes the above physical characteristics of the several oil-bearing strata.

TABLE 1

| Zone | Strata Interval (feet) | Thickness ($h$) (feet) | Porosity ($\phi$) (percent) | Permeability ($k$) (millidarcies) |
| --- | --- | --- | --- | --- |
| 1 | 2600–2700 | 100 | 20 | 10 |
| 2 | 2750–2800 | 50 | 10 | 25 |
| 3 | 2950–3000 | 50 | 15 | 50 |

The proper volumetric flow rate and fluid viscosity of the flooding fluid injected into each of the oil-bearing strata is calculated from equations set forth below and in U.S. Pat. No. 3,251,413. The following equations are employed in calculating the volumetric flow rates:

$$Q_1 = (Q_2/\phi_2 h_2)\, \phi_1 h_1; \qquad (1)$$

$$Q_2 = (Q_3/\phi_3 h_3)\, \phi_2 h_2; \qquad (2)$$

$$Q_3 = (Q_1/\phi_1 h_1)\, \phi_3 h_3; \qquad (3)$$

wherein $Q$ is the volumetric flow rate in barrels per day and the subscripts 1, 2 and 3 represent the respective zones. $\phi$ and $h$ are defined in the above table.

The above equations are dependent upon the arbitrary selection of an injection rate for one zone, and accordingly the injection rate for zone 1 is selected as 100 barrels per hour. The injection rates into zones 2 and 3 are calculated as follows:

$Q_3 = [100/(.20)(100)](.10`(50) = 25$ barrels per hour $Q_2 = [25/(.1)(50)](.15)(50) = 37.5$ barrels per hour The following equations are employed in calculating the proper flooding fluid viscosities:

$$\mu_1 = \left[\frac{Q_2\mu_2}{k_2h_2}\right]\left[\frac{k_1h_1}{Q_1}\right] \quad (4)$$

$$\mu_2 = \left[\frac{Q_3\mu_3}{k_3h_3}\right]\left[\frac{k_2h_2}{Q_2}\right] \quad (5)$$

$$\mu_3 = \left[\frac{Q_1\mu_1}{k_1h_1}\right]\left[\frac{k_3h_3}{Q_3}\right] \quad (6)$$

wherein $\mu$ is the fluid viscosity and $Q$, $k$, and $h$ are defined supra.

The above equations are dependent upon the arbitrary selection of a viscosity for one zone, and accordingly, the fluid viscosity for zone 1 is selected as 10 centipoises. The viscosities of the flooding fluids injected into zones 2 and 3 are calculated as follows:

$$\mu_3 = \left[\frac{(100)(10)}{(10)(100)}\right]\left[\frac{(50)(50)}{25}\right]$$

$= 100$ centipoises;

$$\mu_2 = \left[\frac{(25)(100)}{(50)(50)}\right]\left[\frac{(25)(50)}{37.5}\right]$$

$\mu_2 = 33$ centipoises.

The following table 2 summarizes the appropriate injection rates and flooding fluid viscosities to retard cross-flow between adjacent oil-bearing strata.

TABLE 2

| Zone | Strata Interval (feet) | Flow rate ($Q$) (barrels/hr) | Viscosity ($\mu$) (centipoises) |
|---|---|---|---|
| 1 | 2600–2700 | 100 | 10 |
| 2 | 2750–2800 | 37.5 | 33 |
| 3 | 2950–3000 | 25 | 100 |

The two injection tubes (A and B) are selectively perforated at the three injection intervals so that 15 barrels per hour and 85 barrels per hour are injected into the first injection interval (2600–2700 feet) from injection tubes A and B respectively; 5 barrels per hour and 32 barrels per hour are injected into the second injection interval (2750 to 2800 feet) from injection tubes A and B respectively; and 25 barrels per hour are injected into the third injection interval (2950–3000 feet) from injection tube A.

The flooding operation is started by injecting 117 barrels per hour of water into injection tube B and 45 barrels per hour of water containing 0.039 weight percent of a partially hydrolyzed polyacrylamide having an average molecular weight of about 10,000,000 and marketed by Dow Chemical Company under the trademark Pusher 700, into injection tube A. The fluid in each tube enters the well bore in each of the three injection intervals and forms mixtures therein having viscosities of 10 centipoises, 33 centipoises and 100 centipoises, respectively.

The injection rates are maintained for 10 hours and thereafter water is injected into both injection tubes to force the fluid mixtures deep in the formation.

The preceding examples are presented solely to illustrate the preferred mode of practice of this invention and it is not intended that these examples be construed as unduly limiting the invention, but instead it is intended that the invention include only the limitations set forth in the following claims.

I claim:

1. A method for simultaneously injecting a plurality of fluid mixtures consisting of different proportions of two or more component fluids into a like plurality of vertically disposed permeable subterranean strata penetrated by an injection well, which comprises:

separately flowing each of said component fluids through said well to said vertically disposed permeable subterranean strata;

continuously admixing said component fluids in controlled proportions in a plurality of vertically disposed sections of said well to provide a fluid mixture consisting of a selected, different proportion of said component fluids adjacent to each of said vertically disposed permeable subterranean strata; and simultaneously forcing each of said fluid mixtures into the adjacent subterranean strata.

2. The method defined in claim 1 wherein two component fluids are separately flowed into said injection well, and wherein said fluid mixtures are admixtures of different proportions of said two component fluids.

3. The method defined in claim 1 wherein said component fluids are selected from the group consisting of water, brine, liquefied petroleum oil, and wherein one of said component fluids contains a property promoting additive.

4. The method defined in claim 3 wherein said additive is selected from the group consisting of (1) viscosity increasing agents, (2) scale inhibitors, (3) wax inhibitors, (4) acids, and (5) plugging agents.

5. The method defined in claim 2 wherein one component fluid is water and the other component fluid is water containing a viscosity increasing agent.

6. The method of claim 1 wherein said plurality of vertically disposed permeable subterranean strata is at least 3.

7. The method defined in claim 1 wherein said fluid mixtures are forced into said subterranean strata by injecting water or brine into the well bore.

8. A method for simultaneously injecting a plurality of fluid mixtures consisting of different proportions of two or more component fluids into a like plurality of vertically disposed permeable subterranean strata penetrated by an injection well, which comprises:

inserting into said injection well at least two injection conduits, each of said injection conduits being perforated at elevations adjacent to said vertically disposed permeable strata, the number and size of said perforations being selected to deliver a desired volumetric flow rate of said component fluids into the well adjacent to each of said strata;

simultaneously flowing a component fluid through each of said injection conduits at a controlled volumetric flow rate whereby a desired volume of each of said component fluids is discharged through the perforations of said injection conduits into the well adjacent to each of said vertically disposed permeable strata;

allowing said component fluids to mix within the well to form fluid mixtures at each elevation consisting of different proportions of the component fluids; and forcing said fluid mixtures into the adjacent permeable subterranean strata.

9. The method defined in claim 8 wherein two component fluids are separately flowed into said injection well, and wherein said fluid mixtures are admixtures of different proportions of said two component fluids.

10. The method defined in claim 8 wherein said component fluids are water, brine, liquefied petroleum gas or petroleum oil, and wherein one of said component fluids contains a property promoting additive.

11. The method defined in claim 10 wherein said additive is selected from the group consisting of (1) viscosity increasing agents, (2) scale inhibitors, (3) wax inhibitors, (4) acids, and (5) plugging agents.

12. The method defined in claim 9 wherein one component fluid is water and the other component fluid is water containing a viscosity increasing agent.

13. The method of claim 8 wherein said plurality of vertically disposed permeable subterranean strata is at least 3.

14. The method defined in claim 8 wherein a packer is placed in the well between each of said vertically disposed permeable strata.

15. The method of claim 8 wherein two injection conduits are inserted into said well bore and suspended therein in juxtaposition.

16. The method of claim 8 wherein two coaxially mounted injection conduits are inserted into said well.

17. A method for injecting at least three fluid mixtures consisting of different proportions of two component fluids into a like number of at least three vertically disposed permeable subterranean strata penetrated by a well, which comprises:

inserting into said well two injection tubes, each of said tubes being perforated at elevations adjacent to said vertically disposed permeable strata, the number and size of said perforations being selected to deliver a desired volumetric flow rate of said component fluids into the well adjacent to each of said strata;

flowing a first component fluid into one of the injection tubes and simultaneously injecting a second component fluid containing a property promoting additive into the other injection tube at controlled volumetric flow rates whereby a desired volume of each of said component fluids is discharged through the perforations of said injection tubes into the well adjacent to each of said strata;

allowing said first and said second injection fluids to mix within the well at each elevation to form a fluid mixture therein adjacent to each of said at least three vertically disposed permeable strata; and forcing said fluid mixtures into the adjacent subterranean strata.

18. The method defined in claim 17 wherein said first component fluid is water and wherein said second component fluid is water containing a viscosity increasing agent.

19. A method for injecting a plurality of differently viscosified fluid mixtures into a like plurality of vertically disposed subterranean oil-bearing strata penetrated by an injection well, which comprises:

inserting into said well two injection tubes, each of said tubes being perforated at elevations adjacent to each of said vertically disposed oil-bearing strata, the number and size of said perforations being selected to deliver a desired volumetric flow rate of said component fluids into the well adjacent to each of said strata;

flowing water through one of said injection tubes and simultaneously flowing water containing a viscosity increasing agent into the other injection tube at controlled volumetric flow rates whereby a desired volume of each of said component fluids is discharged through the perforations of said injection tubes into the well adjacent to each of said strata;

allowing said water and said water-containing said viscosity increasing agent to mix within the well at each elevation to form a plurality of fluid mixtures having different viscosities, one of said fluid mixtures being located adjacent to each of said plurality of vertically disposed permeable strata; and forcing said fluid mixtures into the adjacent subterranean strata.

20. A method for injecting a plurality of differently acidified fluid mixtures into a like plurality of vertically disposed subterranean strata penetrated by an injection well, which comprises:

inserting into said well two injection tubes, each of said tubes being perforated at elevations adjacent to each of said vertically disposed strata, the number and size of said perforations being selected to deliver a desired volumetric flow rate of said component fluids into the well adjacent to each of said strata;

flowing water through one of said injection tubes and simultaneously injecting water containing an acid into the other injection tube at controlled volumetric flow rates whereby a desired volume of each of said component fluids is discharged through the perforations of said injection tubes into the well adjacent to each of said strata;

allowing said water and said water containing said acid to mix within the well at each elevation to form fluid mixtures having different concentrations of acid, one of said fluid mixtures being located adjacent to each of said plurality of vertically disposed permeable strata; and forcing said fluid mixtures into the adjacent subterranean strata.

* * * * *